United States Patent
Barvosa-Carter et al.

(10) Patent No.: US 7,350,851 B2
(45) Date of Patent: Apr. 1, 2008

(54) REVERSIBLY EXPANDABLE ENERGY ABSORBING ASSEMBLY AND METHODS FOR OPERATING THE SAME

(75) Inventors: William Barvosa-Carter, Ventura, CA (US); Nancy L. Johnson, Northville, MI (US); Alan L. Browne, Grosse Pointe, MI (US); Guillermo A. Herrera, Winnetka, CA (US); Geoffrey P. Mc Knight, Los Angeles, CA (US); Alan J. Jacobsen, Pacific Palisades, CA (US); Cameron Massey, Hawthorne, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 556 days.

(21) Appl. No.: 11/075,384

(22) Filed: Mar. 8, 2005

(65) Prior Publication Data

US 2006/0202492 A1   Sep. 14, 2006

(51) Int. Cl.
  *B60R 27/00* (2006.01)
(52) U.S. Cl. .......... 296/187.02; 296/187.03; 296/187.08; 296/187.09; 296/187.11; 296/187.12
(58) Field of Classification Search ........ 296/187.01, 296/187.02, 187.05, 187.08, 187.09, 187.1, 296/187.11, 187.12, 187.13
  See application file for complete search history.

(56) References Cited

U.S. PATENT DOCUMENTS

| | | |
|---|---|---|
| 1,331,359 A | 2/1920 | Parrott et al. |
| 3,817,553 A | 6/1974 | Wilfert |
| 4,165,113 A | 8/1979 | Casse |
| 4,441,751 A | 4/1984 | Wesley |
| 5,049,591 A | 9/1991 | Hayashi et al. |
| 5,055,339 A * | 10/1991 | Eder et al. ............ 428/157 |
| 5,098,124 A | 3/1992 | Breed et al. |
| 5,145,935 A | 9/1992 | Hayashi |
| 5,356,177 A | 10/1994 | Weller |
| 5,370,925 A | 12/1994 | Koseki |
| 5,458,366 A | 10/1995 | Hock et al. |
| 5,506,300 A | 4/1996 | Ward et al. |
| 5,564,535 A | 10/1996 | Kanianthra |
| 5,746,442 A | 5/1998 | Hoyaukin |
| 5,752,716 A | 5/1998 | Fukawatase et al. |
| 5,794,975 A | 8/1998 | Nohr et al. |
| 5,904,370 A | 5/1999 | Steiner et al. |
| 5,925,084 A | 7/1999 | Gotoh et al. |

(Continued)

FOREIGN PATENT DOCUMENTS

WO   WO 03/101722   12/2003

OTHER PUBLICATIONS

Watt et al., "Thermomechanical Properties of a Shape Memory Polymer Foam" (13 pages), no date.

*Primary Examiner*—Lori L. Lyjak

(57) ABSTRACT

A reversible energy absorbing assembly including a cellular lattice comprising a shape memory material disposed within an expandable interior region of the assembly, wherein the shape memory material is adapted to expand from a first configuration to an expanded configuration in response to fluid communication with a fluid source. Once expanded, the assembly effectively absorbs kinetic energy of an object upon impact with the assembly. The shape memory material can be thermally activated to restore the first configuration of the energy absorbing assembly. Methods of operating the energy absorbing assembly are also disclosed.

20 Claims, 6 Drawing Sheets

U.S. PATENT DOCUMENTS

| | | |
|---|---|---|
| 6,170,871 B1 | 1/2001 | Goestenkors et al. |
| 6,196,576 B1 | 3/2001 | Sutherland et al. |
| 6,213,506 B1 | 4/2001 | Swann et al. |
| 6,224,090 B1 | 5/2001 | Lutze et al. |
| 6,305,710 B1 | 10/2001 | Bosgieter et al. |
| 6,334,639 B1 | 1/2002 | Vives et al. |
| 6,338,501 B1 | 1/2002 | Heilig et al. |
| 6,352,281 B1 | 3/2002 | Buss |
| 6,386,623 B1 | 5/2002 | Ryan et al. |
| 6,467,987 B1 | 10/2002 | Larsen et al. |
| 6,474,733 B1 | 11/2002 | Heilig et al. |
| 6,550,341 B2 | 4/2003 | Van Schoor et al. |
| 6,605,111 B2 | 8/2003 | Bose et al. |
| 6,620,287 B2 | 9/2003 | Cass |
| 6,627,275 B1 | 9/2003 | Chen |
| 6,663,821 B2 | 12/2003 | Seward |
| 2001/0028173 A1 | 10/2001 | Demarquilly et al. |
| 2002/0046911 A1 | 4/2002 | Sacks et al. |
| 2002/0101008 A1 | 8/2002 | Sokolowski |
| 2003/0020289 A1 | 1/2003 | Dohrmann et al. |

\* cited by examiner

REVERSIBLY EXPANDABLE ENERGY ABSORBING ASSEMBLY AND METHODS FOR OPERATING THE SAME

BACKGROUND

This disclosure relates to an energy absorbing assembly and more particularly, to a reversible energy absorbing assembly for impact management.

It is known in the prior art to provide various types of personal protection by the use of energy-absorbing devices, such as in helmets, vehicles, and the like. These products are generally designed to absorb a significant percentage of the energy from an impact. Within the vehicle, for example, various types of occupant protection devices may be employed for impact with structural body components such as door pillars, frames, headrails and the like. These components are typically made of steel tubing or steel channels that are welded together to form the structural cage or unitized body for the vehicle and may themselves absorb energy as the result of an impact. In addition, energy absorbers may also be placed over the door pillars, frames, headrails, and other parts of the vehicle to further protect the vehicle occupants during an impact event. Prior art approaches generally have used irreversibly crushable materials (e.g., metal, plastics or foams), irreversible gas inflation devices (e.g. airbags and inflatable side curtains), rigid translation devices (e.g., extendable/retractable knee bolsters), and devices that can change the stroking forces (e.g., magnetorheological or electrorheological material based dampers).

Nevertheless, there still remains a need for improved energy absorbing assemblies. It would be particularly advantageous if the assemblies could operate reversibly for potential reuse.

BRIEF SUMMARY

Disclosed herein is an energy absorbing assembly comprising a rigid support structure having an inlet opening; a flexible covering engaged with the rigid support structure to define an expandable interior region; a fluid source in fluid communication with the inlet opening; and a cellular lattice disposed in the expandable interior region, wherein the cellular lattice comprises a shape memory material adapted to expand from a first configuration to an expanded configuration in response to the fluid communication with the fluid source.

An interior vehicle surface comprises an energy absorbing assembly comprising a rigid support structure having an inlet opening; a flexible covering engaged with the rigid support structure to define an expandable interior region; a fluid source in fluid communication with the inlet opening; and a cellular lattice disposed in the expandable interior region, wherein the cellular lattice comprises a shape memory material adapted to expand from a first configuration to an expanded configuration in response to the fluid communication with the fluid source.

In another embodiment, an energy absorbing assembly includes a rigid support structure; a flexible covering engaged with the rigid support structure to define an expandable interior region; and a cellular lattice disposed in the expandable interior region, wherein the cellular lattice comprises a shape memory material adapted to expand from a first configuration to an expanded configuration and/or contract from the expanded configuration to the first configuration in response to a thermal activation signal.

A method of operating an energy absorbing assembly comprises attaching the energy absorbing assembly to a rigid support structure having at least one inlet opening, wherein the energy absorbing assembly comprises a flexible covering engaged with the rigid support structure to define an expandable interior region, a fluid source in fluid communication with the inlet opening, and a cellular lattice disposed in the expandable interior region, wherein the cellular lattice consists of a shape memory material adapted to expand from a first configuration to an expanded configuration in response to the fluid communication with the fluid source; expanding the interior region including the cellular lattice from the first configuration to the expanded configuration with the fluid source at a temperature less than a transition temperature of the shape memory material; and thermally activating the shape memory material above the transition temperature causing the cellular lattice to revert back to the first configuration.

In another embodiment, a method of operating an energy absorbing assembly comprises sensing an impact of an object; expanding a cellular lattice comprising a shape memory material disposed within a vehicle interior surface from a first configuration to an expanded configuration; absorbing the impact of the object with the expanded configuration of the cellular lattice; and heating the shape memory material above a transition temperature causing the cellular lattice to revert back to the first configuration, wherein a motion of a cross-section of the cellular lattice is substantially planar and not three-dimensional.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are reversible energy absorbing assemblies for use in vehicle interior impact management that can be rapidly deployed to an expanded configuration so as to absorb kinetic energy associated with impact of an occupant against an interior surface. Advantageously, the energy absorbing assemblies are reversible and utilize a cellular lattice, based on shape memory materials, that undergoes plastic deformation in the expanded configuration so as to provide absorption of impact energy. After deployment, the energy absorbing assembly can recover its pre-deployed configuration by thermally activating the shape memory material. Suitable shape memory materials include, shape memory alloys (SMA), shape memory polymers (SMP), or a combination comprising at least one of the foregoing. While these devices are shown primarily for use in vehicle interiors, it will also be appreciated that these devices could be applied to vehicle exteriors, such as a vehicle hood or bumper for pedestrian impact, to other personal protection equipment, such as helmets, vests, knee pads, and the like as well as to seat and handlebars of motorcycles, all terrain vehicles, bicycles, and the like.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

Figure 1:
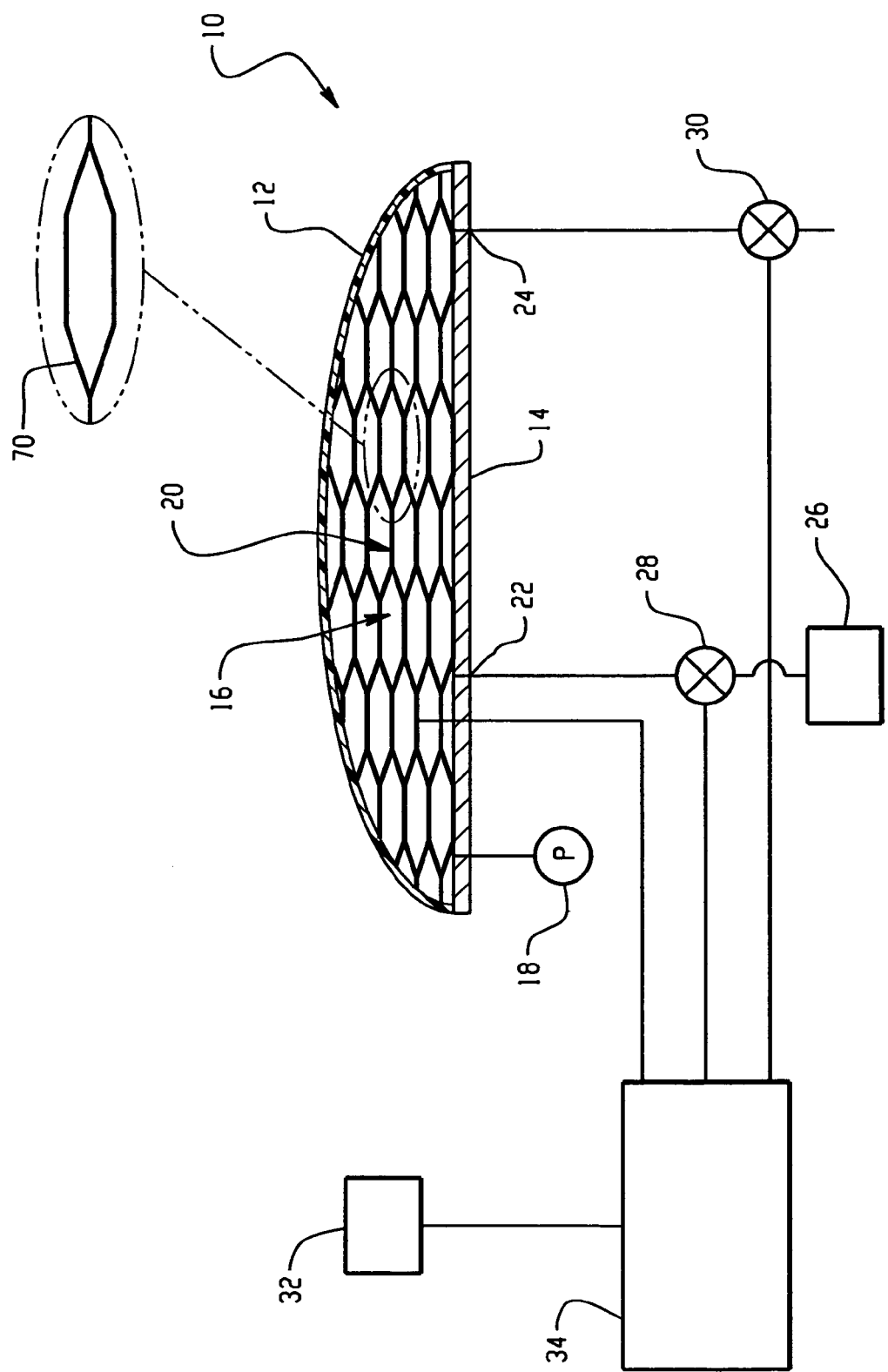
FIG. 1 is a schematic illustration of an energy absorbing assembly in a first configuration.
Figure 2:
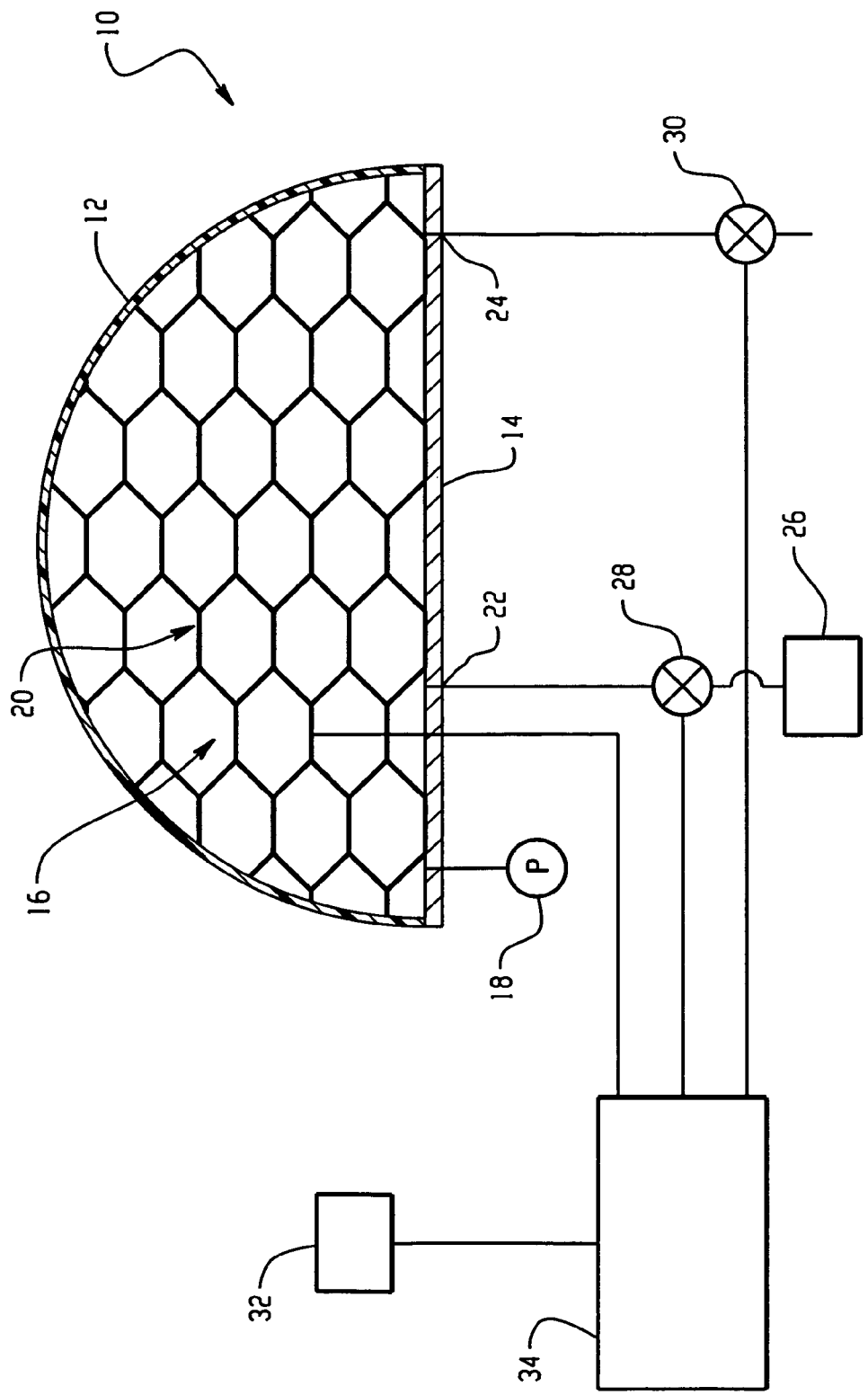
FIG. 2 is a schematic illustration of an energy absorbing assembly in an expanded configuration.
Figure 3:
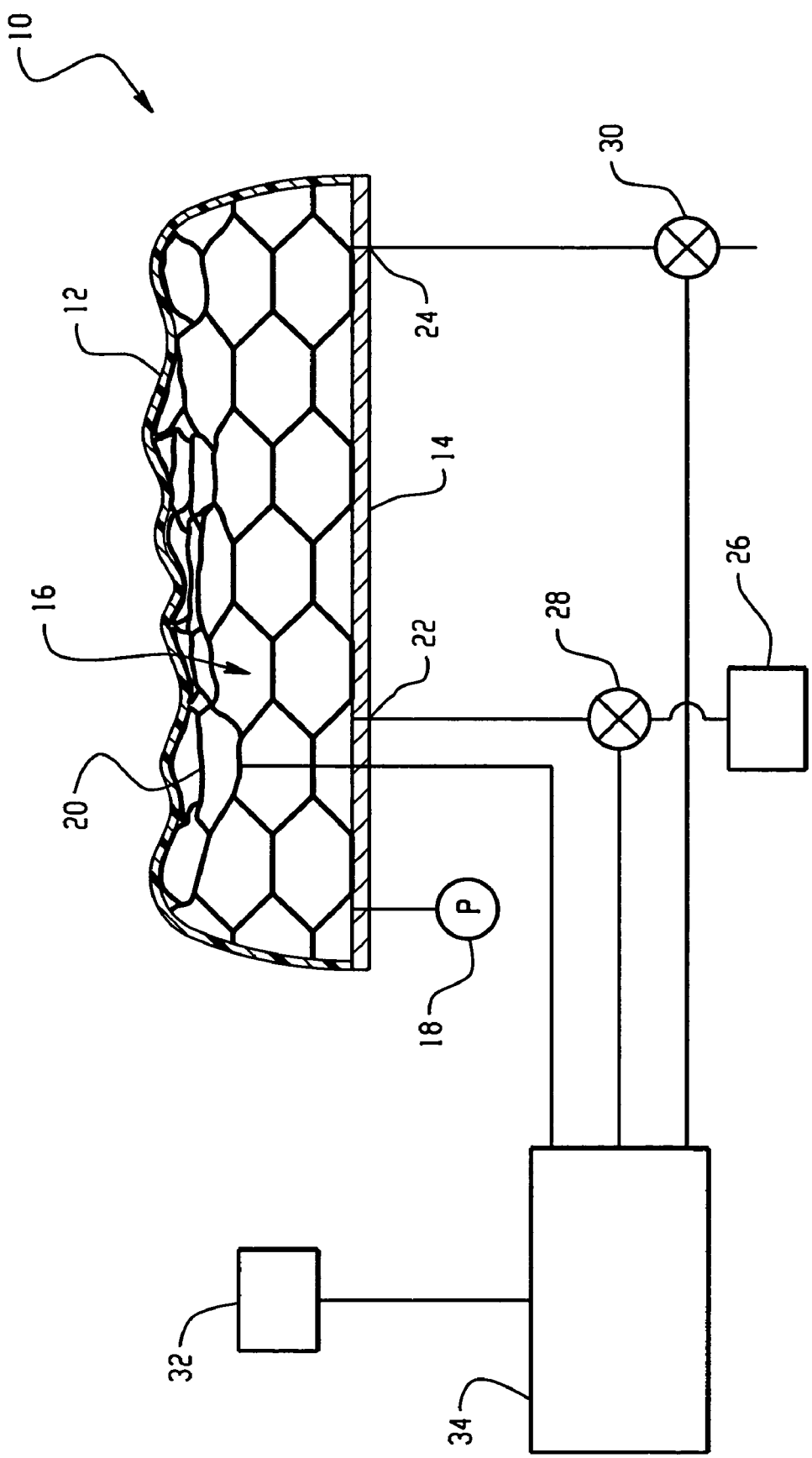
FIG. 3 is a schematic illustration of an energy absorbing assembly in an impacted configuration.

As shown in FIGS. 1-3, an exemplary reversible energy absorbing assembly, generally indicated as 10, comprises a flexible covering 12 attached to a rigid support structure 14. The flexible covering 12 and the rigid support structure 14 define an expandable interior region 16. The shape memory material based cellular lattice 20 is disposed within the expandable interior region 16. The rigid support structure 14 includes an inlet opening 22 and a fluid source 26 in fluid communication with the inlet opening 22. The inlet opening 22 is in fluid communication with the expandable interior region 16 such that any fluid introduced into the inlet opening 22 causes both the interior region 16 and the cellular lattice 20 to expand from a first configuration (FIG. 1) to an expanded configuration (FIG. 2). The term "fluid" is used herein for convenience and refers generically to any liquid, solution, suspension, gas, or combination comprising at least one of the foregoing. The rigid support structure 14 may further include an outlet opening 24 for releasing the fluid from the expandable interior region 16, such as when the interior region 16 decreases in volume from either the expanded configuration (FIG. 2) or the impacted configuration (FIG. 3) to the first configuration (FIG. 1). Alternatively, the flexible covering 12 is sufficiently porous so as to permit pressure relief caused by fluid introduction and interior region 16 expansion. Alternatively, coupled with the inlet 22 and the outlet 24 are valves 28 and 30, respectively, for selectively introducing and discharging fluid from the interior region 16.

For impact energy management, it is preferred that the expansion time be relatively rapid. That is, the fluid source should concomitantly cause rapid expansion of the interior region 16, including the cellular lattice 20, and outward expansion of the flexible covering 12. In one embodiment, the energy absorbing assembly is configured to fully expand from the first configuration (FIG. 1) to the expanded configuration (FIG. 2) within about 50 milliseconds (msec) or less when utilized with a vehicle impact sensor. In another embodiment, such as in combination with a pre-impact sensor, the energy absorbing assembly is configured to fully expand from the first configuration (FIG. 1) to the expanded configuration (FIG. 2) within about 200 milliseconds (msec) or less. In one embodiment, the energy absorbing assembly is configured to provide a volume expansion greater than 50 percent. In another embodiment, the energy absorbing assembly is configured to provide a volume expansion greater than 200 percent.

The energy absorbing assembly 10 further comprises a sensor 32 and a controller 34 in operative communication with the fluid source 26 and the optional valves 28 and 30 for selectively expanding the interior region 16 in response to an activation signal provided by the sensor 32 to the controller 34. In one embodiment, the sensor 32 and the controller 34 are also in operative communication with the shape memory material for selectively expanding and contracting the cellular lattice 20 in response to the activation signal provided by the sensor 32 to the controller 34. Alternatively, a different sensor (not shown) and/or a different controller (not shown) are in operative communication with the shape memory material for selectively expanding and contracting the cellular lattice 20 in response to the activation signal provided.

The sensor 32 may be configured to provide pre-impact or impact information to the controller 34, which then actuates the energy absorbing assembly 10, first configuration (FIG. 1), under pre-programmed conditions defined by an algorithm or the like. In this manner, the assembly 10 can be used to anticipate, or to respond to, an event such as an impact with an object and provide absorption of the kinetic energy associated with an occupant within the vehicle as a result of the impact. In the event a subsequent impact is not realized, or after the impact event, the energy absorbing assembly 10 may revert back to first configuration (FIG. 1) by activating the shape memory material so as to contract the cellular lattice 20 and/or by opening the outlet opening 24 and valve 30 to discharge the fluid from the interior region. The illustrated energy absorbing assembly 10 is exemplary only and is not intended to be limited to any particular shape, size, configuration, or the like.

In one embodiment, the flexible covering 12 has at least a portion of it (e.g., the portion that is immediately engaged with the rigid support structure) fabricated from a material that is elastic (flexible) with respect to the limits of the assembly expansion so that it can return to its original geometry. Alternatively, the entire flexible covering 12 may be fabricated from a material that is elastic (flexible). Suitable flexible materials include elastomers such as styrene butadiene rubber, polyurethanes, polyisoprene, neoprene, chlorosulfonated polystyrenes, and the like. Other materials suitable for use in the flexible covering 12 will be apparent to those skilled in the art in view of this disclosure. Desirably, the material chosen for the flexible cover accommodates reversible strains of at least about 50%, with strains of about 200 to about 400 percent more appropriate. The flexible covering 12 can be decoratively patterned or, optionally, an outer decorative covering (not shown) can be provided in sliding engagement over the flexible covering 12, e.g., a stretchable fabric or the like.

Figure 4:
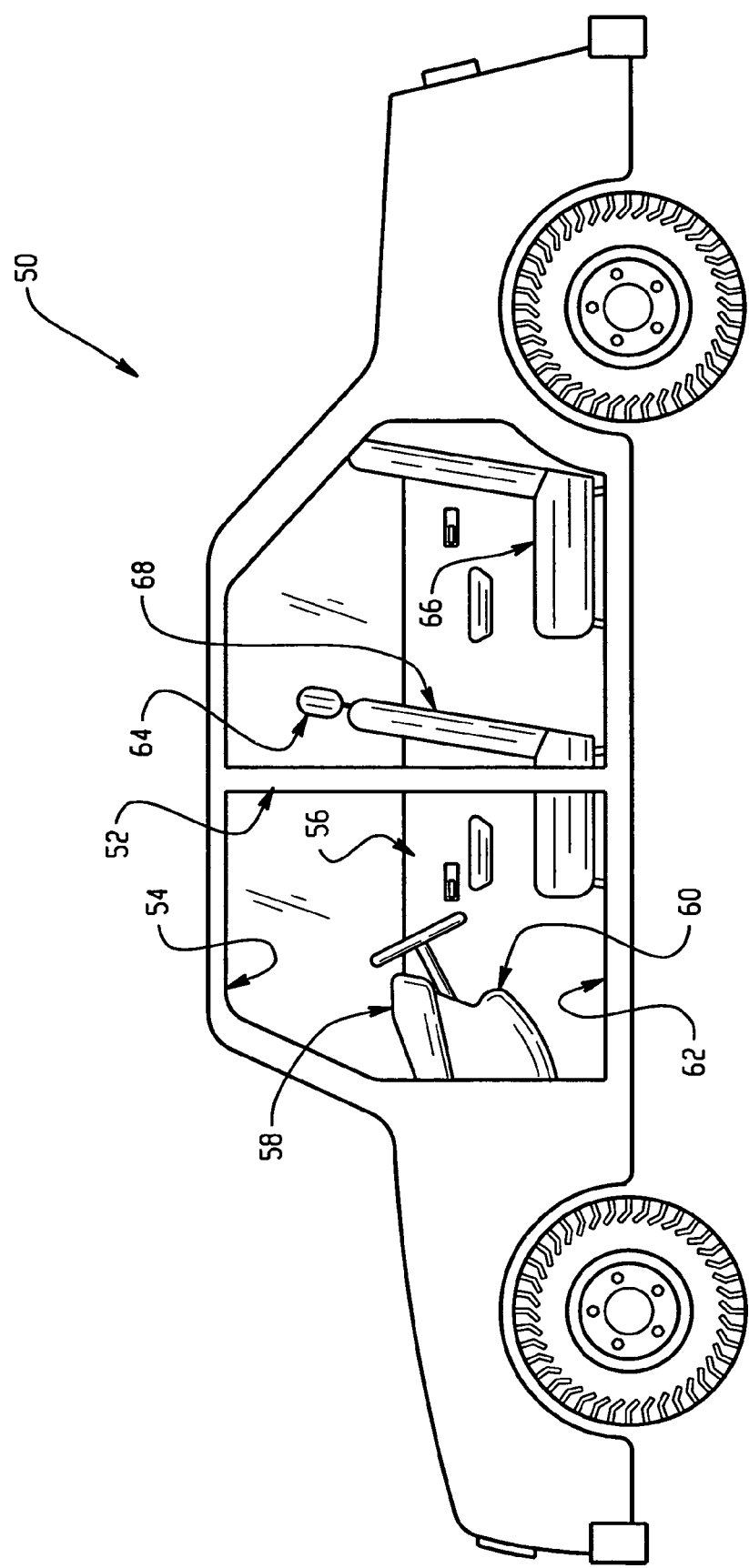
FIG. 4 is a side perspective view of a vehicle illustrating various support structures suitable for employing the energy absorbing assembly.

The rigid support structure 14 is preferably a stationary support for an interior surface of a vehicle. The rigid support structure 14 may be an integrated component of the vehicle or may be attached to the integrated component of the vehicle. FIG. 4 illustrates various uses or locations of the energy absorbing assembly 10 in a vehicle environment. The energy absorbing assembly 10 can be used to, replace at least a part of any conventional padded interior surfaces in the vehicle 50 or any location that occupant and/or cargo protection may be desired. For example, the energy absorbing assembly 10 can be used for the door pillars 52, the header 54, the door interiors 56, the dashboard 58, the sun visors, the armrests, the knee bolsters 60, and other areas such as under the carpet on the vehicle floor 62; in the headrest 64 of the seat, the seat 66 itself, the seat backs 68, cargo area (not shown), truck bed, or like surfaces where absorption of kinetic energy caused by impact of an object with the surface is desired and/or proper positioning of an occupant is desired during an impact. For example, locating the energy absorbing assembly 10 under the carpet can be used to assist the positioning of an occupant's knees with respect to the knee bolster. In the seat area, the energy absorbing assembly can be strategically positioned to provide stiffening at an edge of the seat 66 to provide antisubmarining properties and help keep an occupant from sliding forward in the event of an impact. Other areas of the vehicle, such as a door pillar, roof rail, center console, cargo area, truck bed, or steering wheel, can provide energy absorption properties to the occupant and/or cargo in the event of the impact, thereby decreasing the forces associated with an impact to the occupant.

Optionally, the expandable interior region 16 provided by the flexible covering 12 and the rigid structure 14 may comprise multiple sealed compartments, wherein each sealed compartment includes a fluid inlet in communication with a gas source as previously described as well as a shape memory material based cellular lattice disposed therein. In this manner, the system advantageously provides redundancy, thereby preventing complete system failure due to puncture of one of the interior regions, malfunction of the valves, blockage, fatigue related failures, and other like failures.

Figure 5:
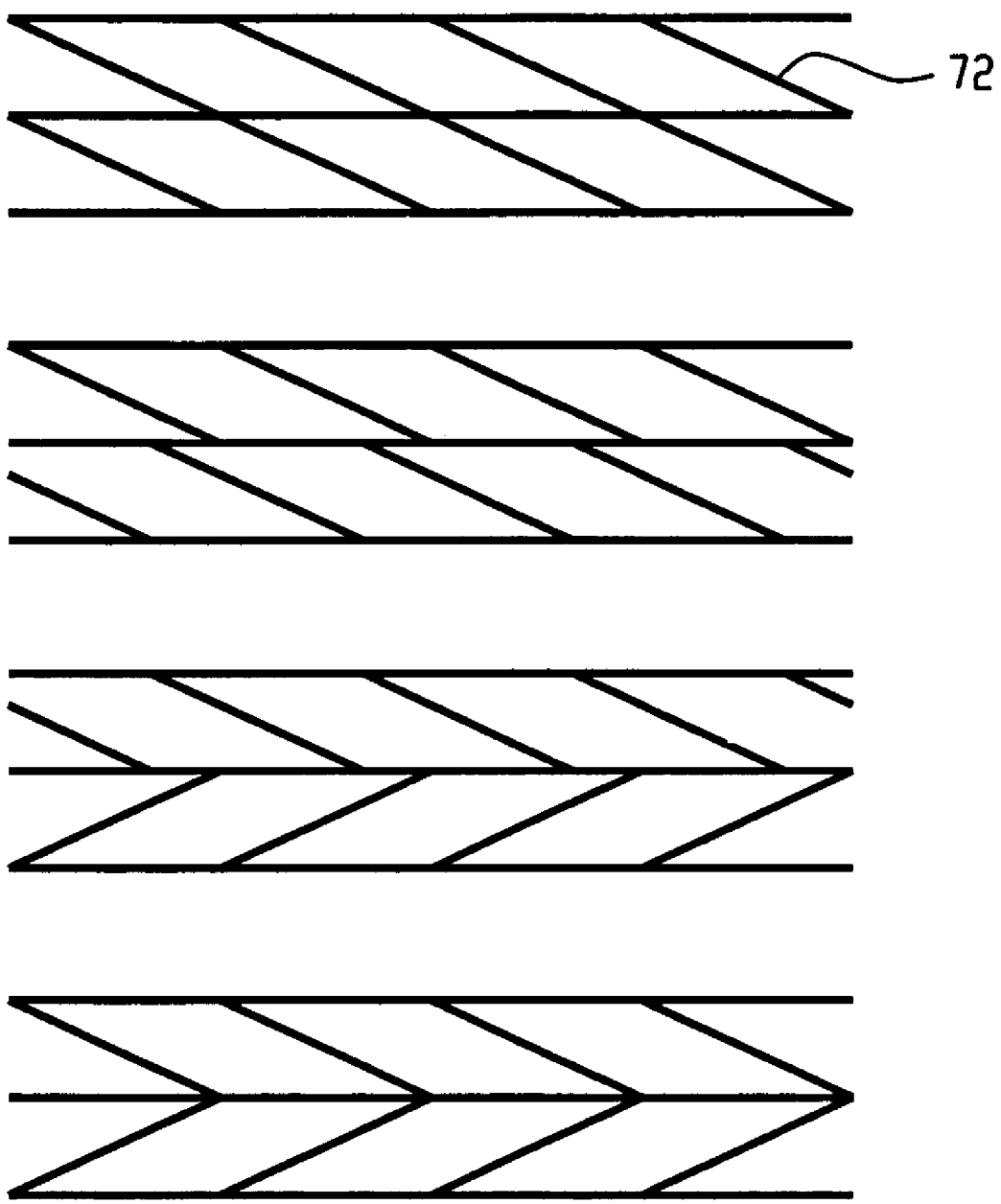
FIG. 5 illustrates various permutations of diamondoid-based cellular lattices.
Figure 6:
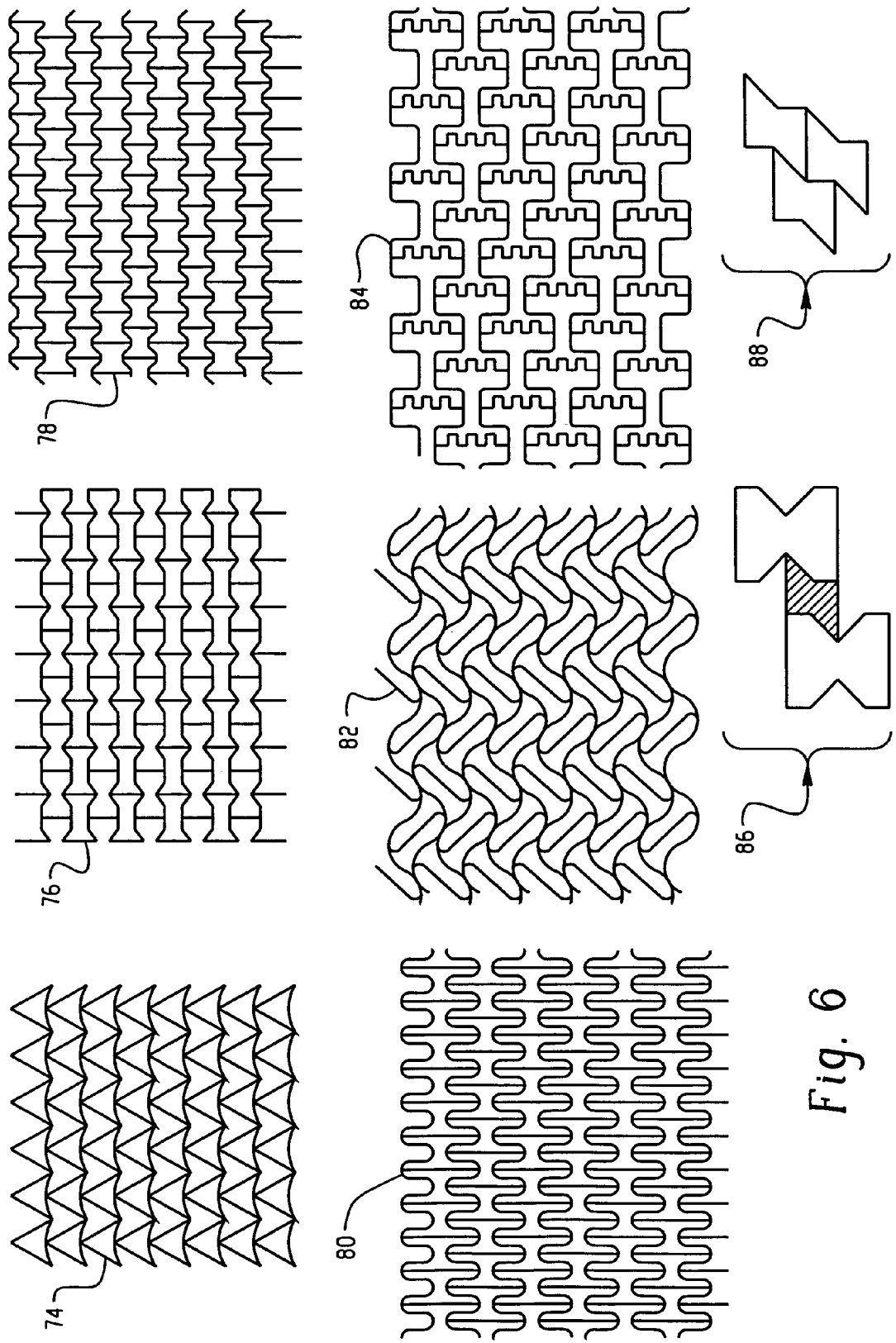
FIG. 6 illustrates various auxetic unit cell geometry based cellular lattices.

The shape memory material based cellular lattice 20 may comprise unit cells that adopt various planar configurations. In one embodiment, as illustrated in FIGS. 1-3, the cellular lattice 20 may comprise planar hexagonal unit cells 70. In other embodiments, the cellular lattice 20 has diamondoid unit cells 72, which may be stacked in layers that are staggered or unstaggered and/or that are parallel or anti-parallel in relation to each other. A few of the various diamondoid unit cell 72 permutations are illustrated in FIG. 5. In other embodiments, the unit cells have auxetic geometries. As used herein, the term "auxetic" refers to those geometries with a Poisson's ratio (ratio of transverse contraction strain to longitudinal extension strain) that is negative. Suitable auxetic geometries include arrowheads 74, bowties 76, anvils 78, dogbones 80, nipples 82, frayed dogbones 84, hybrids comprising at least one of the foregoing geometries 86, or distorted geometries comprising at least one of the foregoing geometries 88, and may be stacked in layers that are staggered or unstaggered and/or that are parallel or anti-parallel in relation to each other. A few of the various auxetic geometry permutations are illustrated in FIG. 6. Desirably, the motion of a cross section of the cellular lattice 20, when expanding form the first configuration and/or contracting from the expanded or impacted configuration in response to the thermal activation, is substantially planar and not three-dimensional.

In one embodiment, the cellular lattice 20 comprises the shape memory material. Alternatively, the cellular lattice 20 consists essentially of the shape memory material. As discussed previously, suitable shape memory materials include SMAs and SMPs.

Suitable SMAs can exhibit a one-way shape memory effect, an intrinsic two-way effect, or an extrinsic two-way shape memory effect depending on the alloy composition and processing history. The two phases that occur in SMAs are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from SMA compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a SMA composition that will automatically reform itself.

The temperature at which the SMA remembers its high temperature form when heated can be adjusted by slight changes in the composition of the alloy and through heat treatment. In nickel-titanium SMAs, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the SMA vary greatly over the temperature range spanning their transformation, typically providing the shape memory material with shape memory effects as well as high damping capacity. The inherent high damping capacity of the SMAs can be used to further increase the energy absorbing properties.

Suitable SMA compositions include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Other suitable active materials are SMPs. Similar to the behavior of a SMA, when the temperature is raised through its transition temperature, the SMP also undergoes a change in shape orientation. To set the permanent shape of the SMP, the polymer must be at about or above the Tg or melting point of the hard segment of the polymer. "Segment" refers to a block or sequence of polymer forming part of the SMP. The SMPs are shaped at the temperature with an applied force followed by cooling to set the permanent shape. The temperature necessary to set the permanent shape is preferably between about 100° C. to about 300° C. Setting the temporary shape of the SMP requires the SMP material to be brought to a temperature at or above the Tg or transition temperature of the soft segment, but below the Tg or melting point of the hard segment. At the soft segment transition temperature (also termed "first transition temperature"), the temporary shape of the SMP is set followed by cooling to lock in the temporary shape. The temporary shape is maintained as long as it remains below the soft segment transition temperature. The permanent shape is regained when the SMP fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

SMPs may contain more than two transition temperatures. A SMP composition comprising a hard segment and two soft segments can have three transition temperatures: the highest transition temperature for the hard segment and a transition temperature for each soft segment.

Most SMPs exhibit a "one-way" effect, wherein the SMP exhibits one permanent shape. Upon heating the SMP above the first transition temperature, the permanent shape is achieved and the shape will not revert back to the temporary shape without the use of outside forces. As an alternative, some SMP compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the SMP changes its shape in the direction of the first permanent shape to the second permanent shape. Each of the permanent shapes belongs to one component of the SMP. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the SMA materials, the SMPs can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable SMPs include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

The SMP or SMA may be thermally activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

In one embodiment, the fluid from the fluid source 26 may be continuously heated, or cooled, after being introduced into the inlet opening 22 such that after a selected time period, the temperature of the fluid in the expandable interior region 16 is suitable to thermally activate the SMA or SMP to substantially return the cellular lattice 20 to the first configuration (FIG. 1). Desirably, the selected time period is such that any energy absorption from impact would have already happened (e.g., at least about 15 seconds). In another embodiment, the cellular lattice 20 may be thermally activated by a resistive heater (not shown) in operative communication with the controller 34 and the cellular lattice 20.

The fluid may be stored in the vehicle as a gas in a pneumatic device such as a compressed gas container or from an accumulator or may be generated pyrotechnically, or hydraulically. Alternatively, the fluid may be a liquid and may be injected into the interior region 16 causing expansion thereof. Suitable fluids include inert gases, air, water, and the like. Preferably, the fluid is non-flammable. The fluid may be recharged after expansion of the assembly. For example, an on-board compressor may be employed. Alternatively, replacement of the fluid and/or fluid source 26 may be made or a repair may be made to recharge the fluid.

In operation, once a crash event or the imminence of a crash event has been detected by sensor 32, the fluid inlet pressure valve 28 is opened causing fluid to flow into the interior region 16 and concomitantly expand the flexible covering 12 and the cellular lattice 20 (i.e., the energy absorbing assembly 10 expands from the first configuration of FIG. 1 to the expanded configuration of FIG. 2). A pressure sensor 18 can optionally be used to monitor the force of the expansion, which is fed back to the controller 34. Expansion continues until the backpressure within the interior region 16 reaches a predetermined pressure, at which time fluid flow into the interior region 16 is discontinued or pressure relief valve 30 opens to maintain the predetermined pressure. In one embodiment, the selected pressure is about 20 to about 100 pounds per inch squared (psi) based upon a combination of sensor inputs and other types of event inputs such as, for example, inputs as to weight of occupant (child versus adult), whether occupant is restrained or unrestrained by a seatbelt, and the like. Alternatively, expansion may continue for a predetermined time so as to provide sufficient expansion.

The energy absorbing assembly 10 can be applied to any rigid support structure 14 wherein it is desired to provide a kinetic energy reduction associated with an occupant and/or or object impacting the support structure and/or for proper positioning of an occupant. As such, the system is extremely versatile. Because of the short expansion times, this type of energy absorbing assembly is particularly well suited for use with impact detection systems using impact detection means plus algorithms to trigger deployment (i.e., systems similar to that used in conventional airbag restraint systems). Restoration of the device from the expanded configuration (FIG. 2) or the impacted configuration (FIG. 3) to the first configuration (FIG. 1) would have no such requirement for rapid action and thus could be effectively managed by thermal activation of the shape memory material to its permanent or trained configuration.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An energy absorbing assembly, comprising:
   a rigid support structure having an inlet opening;
   a flexible covering engaged with the rigid support structure to define an expandable interior region;
   a fluid source in fluid communication with the inlet opening; and
   a cellular lattice disposed in the expandable interior region, wherein the cellular lattice comprises a shape memory material adapted to expand from a first configuration to an expanded configuration in response to the fluid communication with the fluid source.

2. The energy absorbing assembly of claim 1, further comprising means for thermally activating the shape memory material, wherein thermally activating the shape memory material results in the energy absorbing assembly returning to the first configuration from the expanded configuration.

3. The energy absorbing assembly of claim 1, further comprising an impact or a pre-impact sensor in operative communication with a controller, wherein the controller is in operative communication with the inlet opening.

4. The energy absorbing assembly of claim 1, wherein the shape memory material is a shape memory polymer, a shape memory alloy, or a combination comprising at least one of the foregoing materials.

5. The energy absorbing assembly of claim 1, wherein the rigid support structure comprises a vehicle door pillar, a vehicle header, a vehicle door interior, a vehicle dashboard, a vehicle sun visor, a vehicle armrest, a vehicle knee bolster, a vehicle floor, a vehicle headrest, a vehicle seat, a vehicle seat back, a vehicle cargo area, a vehicle bed, or a vehicle steering wheel.

6. The energy absorbing assembly of claim 1, wherein the fluid source comprises a pneumatic device, hydraulic device, pyrotechnic device, or a combination comprising at least one of the foregoing devices.

7. The energy absorbing assembly of claim 1, wherein a unit cell of the cellular lattice comprises a hexagon, diamondoid, or a combination comprising at least one of the foregoing.

8. The energy absorbing assembly of claim 1, wherein a unit cell of the cellular lattice comprises an auxetic geometry.

9. The energy absorbing assembly of claim 1, wherein the cellular lattice is adapted to expand from the first configuration to the expanded configuration in an axial direction.

10. The energy absorbing assembly of claim 1, further comprising a pressure sensor in operative communication with the controller, wherein the pressure sensor monitors a pressure within the expandable interior region.

11. An interior vehicle surface, comprising:
    an energy absorbing assembly comprising a rigid support structure having an inlet opening; a flexible covering engaged with the rigid support structure to define an expandable interior region; a fluid source in fluid communication with the inlet opening; and a cellular lattice disposed in the expandable interior region, wherein the cellular lattice comprises a shape memory material adapted to expand from a first configuration to an expanded configuration in response to the fluid communication with the fluid source.

12. The interior vehicle surface of claim 11, wherein the energy absorbing assembly forms a door pillar surface, a headrest surface, a floor surface, a seat surface, a dashboard surface, a steering wheel surface, a door surface, a ceiling surface, a header, a roof rail, a center console, a cargo area surface, or a combination comprising at least one of the foregoing interior vehicle surfaces.

13. The interior vehicle surface of claim 11, wherein the shape memory material is a shape memory polymer, a shape memory alloy, or a combination comprising at least one of the foregoing materials.

14. The interior vehicle surface of claim 11, wherein the fluid source comprises a pneumatic device, hydraulic device, pyrotechnic device, or a combination comprising at least one of the foregoing devices.

15. The interior vehicle surface of claim 11, wherein a unit cell of the cellular lattice comprises a hexagon, diamondoid, or a combination comprising at least one of the foregoing.

16. The interior vehicle surface of claim 11, wherein a unit cell of the cellular lattice comprises an auxetic geometry.

17. The interior vehicle surface of claim 11, wherein the cellular lattice is adapted to expand from the first configuration to the expanded configuration in an axial direction.

18. The interior vehicle surface of claim 11, wherein the energy impact absorber further comprises an impact or a pre-impact sensor in operative communication with a controller, wherein the controller is in operative communication with the inlet opening.

19. A method of operating an energy absorbing assembly, comprising:
    attaching the energy absorbing assembly to a rigid support structure having at least one inlet opening, wherein the energy absorbing assembly comprises a flexible covering engaged with the rigid support structure to define an expandable interior region, a fluid source in fluid communication with the inlet opening, and a cellular lattice disposed in the expandable interior region, wherein the cellular lattice consists of a shape memory material adapted to expand from a first configuration to an expanded configuration in response to the fluid communication with the fluid source;
    expanding the interior region including the cellular lattice from the first configuration to the expanded configuration with the fluid source at a temperature less than a transition temperature of the shape memory material; and
    thermally activating the shape memory material above the transition temperature causing the cellular lattice to revert back to the first configuration.

20. The method of operating the energy absorbing assembly of claim 19, further comprising recharging the fluid source.

* * * * *